United States Patent [19]
Russ

[11] Patent Number: 5,561,374
[45] Date of Patent: Oct. 1, 1996

[54] METHOD FOR DISPLAYING A VEHICLE SPEED MEASUREMENT WITH IMPROVED DISPLAY RESPONSE CHARACTERISTICS

[75] Inventor: Ronald P. Russ, Farmington Hills, Mich.

[73] Assignee: Ford Motor Company, Dearborn, Mich.

[21] Appl. No.: 334,098

[22] Filed: Nov. 3, 1994

[51] Int. Cl.[6] .............................. G01P 3/42; G01P 1/04; G01P 3/00
[52] U.S. Cl. .................... 324/166; 324/144; 364/565; 364/572
[58] Field of Search .................... 324/160, 161, 324/163, 166, 167, 143, 144, 146; 364/565, 572; 377/24, 24.1

[56] References Cited

U.S. PATENT DOCUMENTS

| | | | |
|---|---|---|---|
| 3,699,563 | 10/1972 | Cass | 324/161 X |
| 3,748,533 | 7/1973 | South | 324/166 X |
| 4,648,104 | 3/1987 | Yachida et al. | 324/166 X |
| 4,779,213 | 10/1988 | Luitje | 324/166 X |
| 4,924,420 | 5/1990 | Hadley et al. | 324/160 |
| 4,939,675 | 7/1990 | Luitje | 324/166 X |
| 4,988,944 | 1/1991 | Ito | 324/143 X |
| 5,097,203 | 3/1992 | Haussmann et al. | 324/167 X |
| 5,225,749 | 7/1993 | Watanabe | 324/163 X |
| 5,357,196 | 10/1994 | Ito | 324/166 |

Primary Examiner—Gerard R. Strecker
Attorney, Agent, or Firm—Paul K. Godwin

[57] ABSTRACT

A vehicle speed measurement system (8) and method for driving a vehicle speed display responsive to a vehicle speed signal (300-334). A vehicle speed signal having a period corresponding to distance traveled by a vehicle is counted each first predetermined time period to provide a count (300-314); a preselected number of the counts are summed (316), the sum is filtered (318); the filtered sum is converted to the measurement of vehicle speed and a control signal for driving the vehicle speed display in response to the measurement is generated (320).

3 Claims, 2 Drawing Sheets

METHOD FOR DISPLAYING A VEHICLE SPEED MEASUREMENT WITH IMPROVED DISPLAY RESPONSE CHARACTERISTICS

BACKGROUND OF THE INVENTION

The invention relates generally to measuring vehicle speed and more specifically to a method and system for measuring vehicle speed and filtering the measurement for display on a vehicle speed display.

In current vehicle speed measurement systems, vehicle speed is derived using a pulse period measurement method. Such a system typically consists of a gear having a plurality of teeth, a magnetic sensor, and signal conditioning circuitry. The gear rotates at a speed that is directly related to the speed of the vehicle. As the gear rotates, the gap between the sensor and the gear increases and decreases as each tooth passes by. This movement causes an electric current to be induced in the magnetic sensor and is converted by the signal conditioning circuitry into a periodic speed signal. Vehicle speed is then derived from this signal by measuring the period of the signal and employing an equation which relates the period of the signal to vehicle speed.

Ideally, vehicle speed using this method can be calculated from a single period measurement. In practice, however, such a single period measurement will not produce an accurate speed measurement because of variances in tooth periods caused by manufacturing tolerances relating to gear concentricity as well as tooth height and width.

To address the accuracy problems associated with tooth to tooth period variations, current systems attempt to average out the effects of the gear manufacturing process by calculating an average pulse period over a full revolution of the gear. A problem associated with the averaging technique, however, is that at low vehicle speeds, such as below 10 mph, the pulse period measurements take much longer to update. Accordingly, the last speed measurement remains displayed for longer and longer periods until an updated measurement is generated. This can result in undesirable display jitter in the low speed range. To avoid this problem, some systems have simply set the display stop set somewhere around 10 mph.

Another problem associated with averaging is that at higher speeds, the effects of manufacturing tolerances become more pronounced and also may result in display jitter.

SUMMARY OF THE INVENTION

An object of the present invention is to display vehicle speed measurements in a full range of vehicle speeds without producing undesirable jitter in the vehicle speed display. The above object is achieved, and disadvantages of prior approaches overcome, by providing both a vehicle speed measurement system and method for driving a vehicle speed display in response to a measurement of vehicle speed. In one particular aspect of the invention, the method comprises the steps of: generating a periodic signal having a period corresponding to distance traveled by a vehicle wherein the periodic signal is derived from a sensor coupled to the vehicle; counting a number of cycles of the periodic signal each first predetermined period of time to provide a count; and deriving the measurement of vehicle speed for driving the vehicle speed display from the count.

Such a method can be used to advantage in a vehicle speed measurement system comprising: a sensor coupled to a vehicle transmission for generating a pulse signal, the pulse signal having first and second states and a period corresponding to distance traveled by a vehicle; a counter for counting a number of pulses of the pulse signal each first predetermined time period to provide a count; a summer providing a sum of a preselected number of the counts each first predetermined time period, the sum corresponding to total pulses each second predetermined time period wherein the second predetermined time period is an integer multiple of the first predetermined time period; a filter for filtering an output of the summer; and a converter for converting the filtered output to a measurement of vehicle speed.

Preferably, the system further comprises control signal means for providing a control signal to a vehicle display responsive to the control signal; and a limiter for limiting the measurement to a maximum position when the measurement exceeds an upper limit, and limiting the measurement of vehicle speed to a maximum allowable change each first predetermined time period when the measurement exceeds the maximum allowable change.

advantage of the above aspect of the invention is that accurate vehicle speed measurement is obtained across a full range of vehicle speeds without producing undesirable jitter in the vehicle speed display.

BRIEF DESCRIPTION OF THE DRAWINGS

The objects and advantages described herein will be more fully understood by reading the description of the preferred embodiment with reference to the drawings wherein.

DESCRIPTION OF THE PREFERRED EMBODIMENTS

Figure 1:
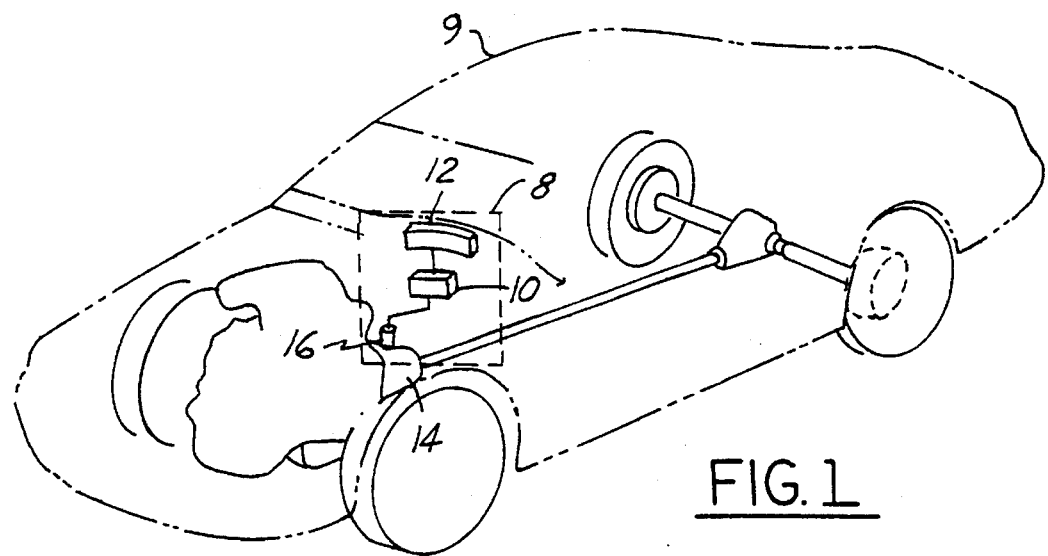
FIG. 1 is a block diagram of the system in which the invention is used to advantage.

An example of an embodiment in which the invention claimed herein is used to advantage is now described with reference to the attached figures. Referring first to FIG. 1, vehicle speed measurement system 8 is shown in vehicle 9 wherein microcomputer 10 controls vehicle speed display 12 in response to measurements from transmission 14. Vehicle speed sensor 16 is shown magnetically coupled to transmission 14 for providing vehicle speed signal VS.

Figure 2:
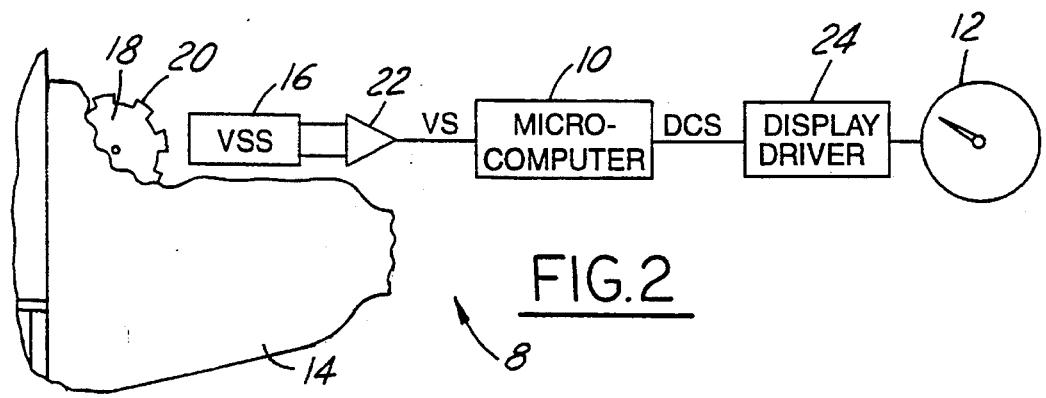
FIG. 2 is a representation of a portion of the embodiment shown in FIG. 1.

Referring now to FIG. 2, gear 18 is driven by transmission 14 and rotates at a speed directly related to vehicle speed. The gap between vehicle speed sensor 16 and gear 18 increases and decreases as each tooth 20 of gear 18 passes by vehicle speed sensor 16. This rotation generates an electric current in the speed sensor which is filtered and buffered in a conventional manner by input signal conditioning circuitry 22 into vehicle speed signal VS, a periodic signal having a period directly related to distance traveled by the vehicle. Microcomputer 10 generates a display control signal DCS responsive to VS for displaying the vehicle speed measurement on vehicle speed display 12. In the described embodiment, vehicle speed display 12 is an air-core meter driven by air-core meter driver 24, such as Signetics Linear Products SA5775, which interfaces with microcomputer 10 through a serial bus.

Figures 3A, 3B:
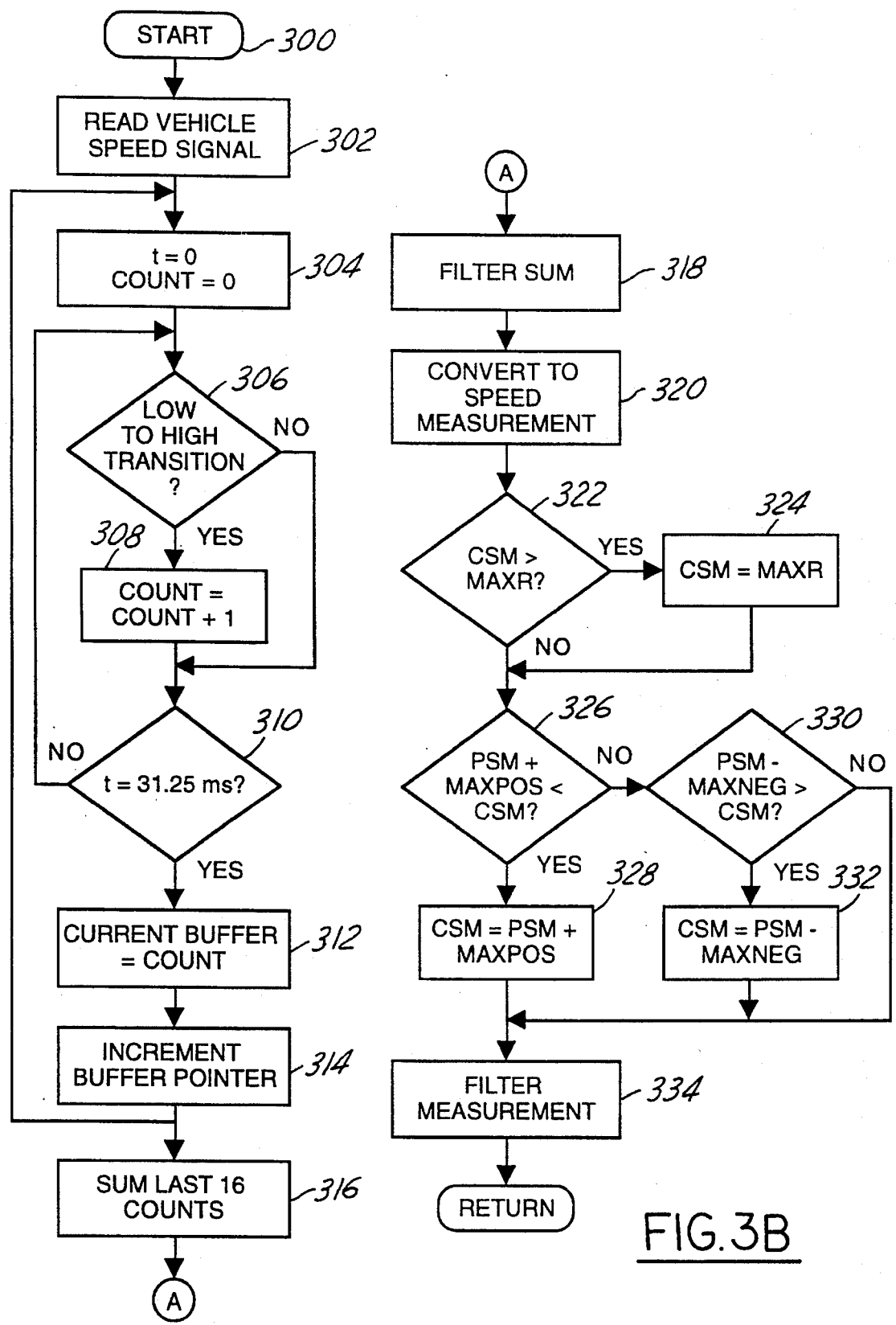
FIGS. 3A and 3B are flowcharts illustrating various process steps performed by a portion of the embodiment shown in FIG. 2.

The operation of microcomputer 10 in generating display control signal DCS is now described with particular reference to the flowchart shown in FIGS. 3A and 3B. At the start of each speed measurement, vehicle speed signal VS is read (see steps 300 and 302). The number of cycles of vehicle speed signal VS is then counted for a preselected period of time, such as 31.25 ms. One method of counting wherein vehicle speed signal VS is a pulse signal with both low and high states sets a timer and counter to zero (step 304). Vehicle speed signal VS is then monitored to determine whether a low to high transition has occurred (step 306). If a transition is detected, the count is incremented by one at step 308. During step 310, a determination is made whether the selected time period has elapsed. Once the selected time has expired, the current count is stored in memory (step 312).

In the present embodiment, a count is stored every 31.25 ms in the current buffer position of a sixteen position memory buffer in microcomputer 10 operating in round robin fashion. After the current count is stored in the current buffer position, a software pointer is incremented to the next buffer position (step 314) and a new count begins. As a result, the buffer contains all counts during the last 0.5 seconds (16 buffer positions*31.25 ms).

A preselected number of counts, such as the last sixteen counts stored in the buffer, are then summed in step 316. During step 318, the sum is filtered to provide a smoother output from the summer. In one embodiment, first-order low-pass filtering described by the following frequency domain equation is used:

$$f(s)=4/(s+4) \tag{1}$$

To implement this filter in real-time, equation (1) is converted into the following state-space equations:

$$x(k+1)=0.875*x(k)+0.5*u \tag{2}$$

$$y(k)=0.25*x(k+1) \tag{3}$$

wherein x (k+1) is the current state, x(k) is the previous state, u is the input (i.e. sum), and y (k) is the output of the filter (i.e. the filtered sum).

Figure 4:
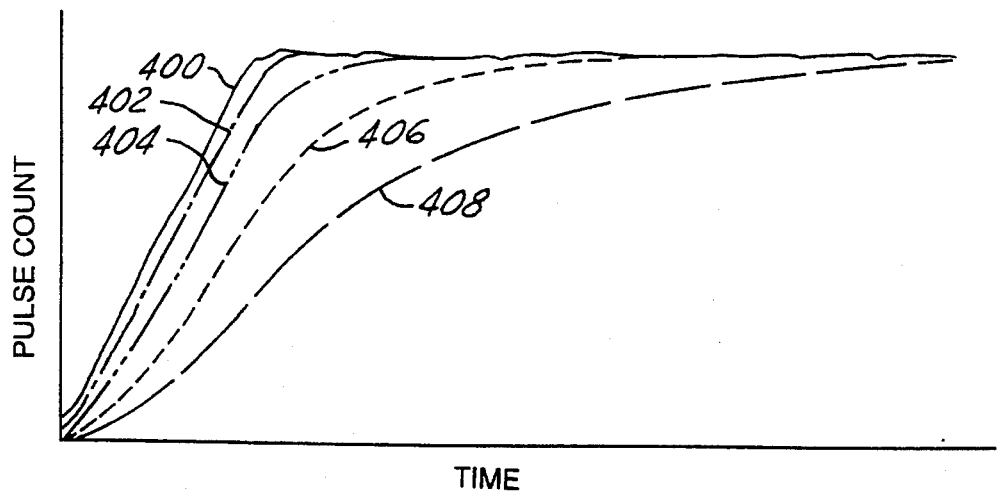
FIG. 4 is a graphical representation presented to help illustrate operation of the embodiment shown in FIG. 1.

One skilled in the art will recognize that many variations of the filter may be used to advantage. For example, an advantage of filtering is that system response time is selectable by adjusting the filter gain. The effect of gain adjustment on system response time is graphically illustrated in FIG. 4 wherein line 400 shows the output over time of an unfiltered system. Line 402 shows the output over time of a system using a filter described in the frequency domain by $f(s)=8/(s+8)$. Line 404 shows the output over time of a system using a filter described in the frequency domain by $f(s)=4/(s+4)$. Line 406 shows the output over time of a system using a filter described in the frequency domain by $f(s)=2/(s+2)$. And, line 408 graphs the output over time of a system using a filter described in the frequency domain by $f(s)=1/(s+1)$. As illustrated, slowing system response provides a smoother output over time and thereby provides an advantage of reducing undesirable display jitter. Higher order filtering may similarly be used to advantage to enhance system performance and response.

Returning to the flowcharts shown in FIGS. 3A and 3B, the filtered sum is converted into display control signal DCS for displaying the speed measurement on vehicle speed display 12 (see step 320). Display control signal DCS can be generated in any form to drive an appropriate display. For example, in one embodiment, the filter output y(k) is converted to an angular pointer position for a display needle using one of the following equations:

$$angle=y(k)*(degrees/mph)*(positions/degrees) \tag{4}$$

$$angle=y(k)*(degrees/kmh)*(positions/degrees) \tag{5}$$

Microcomputer 10 generates digital control signal DCS as a 10-bit digital word corresponding to the angular pointer position which is received by display driver 24 and converted to appropriate output voltages to drive vehicle display 12 in a linear fashion. Obviously, various forms of displays and display control signals can be substituted by those skilled in the art without departing from the spirit and scope of the invention. For example, display control signal DCS could be generated as a digital word corresponding to a number to be displayed on an LCD or LED speed display. Alternatively, driver 24 may be responsive to an analog signal, such as a voltage or current directly proportional to vehicle speed, generated by microcomputer 10.

A determination is made at step 322 whether the current speed measurement exceeds the maximum display capabilities of the vehicle display. If current speed measurement CSM exceeds known maximum range MAXR, then display control signal DCS is set to the maximum value at step 324. Maximum allowable change limits are also preset for each measurement iteration to avoid large visual jumps in speed on the display. For example, to limit positive jumps when speed is increasing a comparison is made between the current speed and previous speed measurements. If current speed measurement CSM is greater than previous speed measurement PSM by more than predetermined maximum positive change MAXPOS (step 326), then digital control signal DCS is set to correspond to previous speed measurement PSM plus maximum positive change MAXPOS (step 328). Alternatively, if current speed measurement CSM does not exceed previous speed measurement PSM by maximum positive change MAXPOS at step 326, then a determination is made at step 330 as to whether current speed measurement CSM is less than previous speed measurement PSM by more than predetermined maximum negative change MAXNEG. If so, then display control signal DCS is set to correspond to previous speed measurement PSM minus maximum negative change MAXNEG at step 332. An advantage is thereby obtained of preventing visual jumps on the speed display in the negative direction when speed is decreasing. Current speed measurement CSM remains unchanged and is displayed accordingly when none of the limits are exceeded.

In the present embodiment, a second filter is employed at step 334 to provide another degree of control over system response and to filter out any error introduced while converting the filtered sum to the speed measurement.

This concludes the description of the preferred embodiment. The reading of it by those skilled in the art will bring to mind many alterations and modifications without departing from the spirit and scope of the invention. For example, while the present embodiment has been described as steps performed by microcomputer 10, the present invention may also be used to advantage using any number of combinations of digital and analog devices commonly known in the art. It is further important to note that the invention may be used to advantage to drive any vehicle speed display wherein the vehicle speed signal is a periodic signal having a known correspondence between period and distance traveled by the vehicle. Accordingly, it is intended that the scope of the invention be limited to only the following claims.

What is claimed:

1. A method for driving a vehicle display in response to a measurement of vehicle speed, said method including the steps of:

generating a pulse signal having first and second voltage levels and a period that corresponds to the speed of travel by a vehicle;

sensing transitions from said first voltage level to said second voltage level of each said pulse signal;

defining first predetermined time period intervals;

counting said sensed transitions occurring during each of said first predetermined time period intervals to provide a pulse count;

summing the counts provided from a pre-selected number predetermined time period intervals to provide a sum value;

filtering said sum value by determining a previous state value corresponding to the filter sum determined immediately prior to the current determination; determining a current state value as the currently measured sum value multiplied by a first predetermined gain factor and added to the previous state value multiplied by a second predetermined gain factor; and determining a currently filtered sum value as said current state value multiplied by a third predetermined gain factor;

converting said currently filtered sum value to said measurement of vehicle speed; and generating a control signal for driving the vehicle speed display in response to said measurement.

2. A method as in claim 1 wherein said first gain factor, said second gain factor and said third gain factor are selected to provide a desired system response time.

3. A method as in claim 1 further, including the steps of:

comparing said vehicle speed measurement to a predetermined maximum value;

setting said vehicle speed measurement to said predetermined maximum value when said measurement exceeds said predetermined maximum value;

comparing said vehicle speed measurement with a previous vehicle speed measurement;

setting said measurement to a previous vehicle speed measurement plus a predetermined maximum positive change value when a difference between said measurement and said previous measurement exceeds said predetermined maximum positive change value; and setting said vehicle speed measurement to said previous vehicle speed measurement value minus a predetermined maximum negative change value when the difference between said measurement and said previous measurement exceeds said predetermined maximum negative change value.

* * * * *